United States Patent
Avgousti et al.

(10) Patent No.: US 6,426,026 B1
(45) Date of Patent: Jul. 30, 2002

(54) PROCESS FOR PELLETIZING ULTRA-HIGH MELT FLOW POLYMERS

(75) Inventors: Marios Avgousti, Plainsboro, NJ (US); Edward Allen Leach, St. Albans, WV (US); Alex Kharazi, Somerset, NJ (US)

(73) Assignee: Union Carbide Chemicals & Plastics Technology Corporation, Danbury, CT (US)

( * ) Notice: Subject to any disclaimer, the term of this patent is extended or adjusted under 35 U.S.C. 154(b) by 0 days.

(21) Appl. No.: 09/473,532

(22) Filed: Dec. 28, 1999

(51) Int. Cl.[7] .............................................. B29C 47/78
(52) U.S. Cl. ...................... 264/143; 264/180; 264/211; 264/211.13
(58) Field of Search .............................. 264/143, 178 R, 264/179, 180, 211, 211.13

(56) References Cited

U.S. PATENT DOCUMENTS

| | | | |
|---|---|---|---|
| 2,975,483 A | | 3/1961 | Cooper et al. |
| 4,025,252 A | | 5/1977 | Hunke .......................... 425/67 |
| 4,528,157 A | * | 7/1985 | Lettner et al. ............... 264/237 |
| 4,530,649 A | | 7/1985 | Philipp et al. ................. 425/71 |
| 5,118,270 A | * | 6/1992 | Keilert et al. ............... 425/72.1 |
| 5,242,289 A | * | 9/1993 | Forgash et al. ............... 425/71 |
| 5,310,515 A | * | 5/1994 | Jurgen et al. ................ 264/143 |
| 5,313,864 A | * | 5/1994 | Forgash et al. ................ 83/349 |
| 5,340,509 A | * | 8/1994 | Chang et al. ................... 264/5 |
| 5,441,394 A | * | 8/1995 | Keilert et al. .................. 425/41 |
| 5,594,074 A | * | 1/1997 | Hwo et al. .................... 525/387 |
| 5,599,562 A | * | 2/1997 | Harris et al. ................... 425/67 |
| 5,611,983 A | * | 3/1997 | Ma et al. ...................... 264/142 |
| 6,228,948 B1 | * | 5/2001 | Flaris et al. .................. 525/285 |

FOREIGN PATENT DOCUMENTS

| | | |
|---|---|---|
| EP | 0728796 | 8/1996 |
| EP | 0894594 | 2/1999 |

* cited by examiner

*Primary Examiner*—Mark Eashoo

(57) ABSTRACT

Disclosed is a process for pelletizing high melt flow crystalline polymers to produce crystalline pellet products. The process includes feeding a polyolefin granular or pelleted polymer into a melting/mixing mechanism to provide a molten polymer material. The molten polymer material is optionally passed through a melt pump and through a die to form a plurality of molten polymer strands. The plurality of molten polymer strands then are passed through or along a water trough declined with respect to the direction of the horizontal arrays where they are sprayed with cool liquid a plurality of times in such a manner that the sprayed cool liquid creates turbulent flow and disturbs a thin film of hot water and/or steam that forms around each molten polymer strand as it is cooled without undesirable axial acceleration of the polymer strands. Subjecting the molten polymer strands to such a cooling procedure produces cooled polymer strands, which then are fed to a cutting mechanism and cut into pellets. The process produces ultra high melt flow crystalline polymer pellets which are uniformly compounded.

10 Claims, No Drawings

PROCESS FOR PELLETIZING ULTRA-HIGH MELT FLOW POLYMERS

BACKGROUND OF THE INVENTION

1. Field of the Invention

This invention relates to a method of pelletizing high melt flow polymers. More particularly, the invention relates to the production of high melt flow polyolefin polymer pellets.

2. Description of Related Art

Almost all of the plastic resin sold in the market today is in the form of pellets. Plastic resins are sold in the form of pellets to improve transportation, handling, safety and end-user material processability characteristics. Reactor granular resin is thus melted and extruded and made to flow through dies before being cut into pellets. The extrusion process also serves as a step for the addition of performance additives for the required stability and material properties. The size, shape and uniformity of the pellets are important and measures of these pellet characteristics are standard quality assurance/quality control (QA/QC) tests to be met during production. The pelletizing step is important from an operational standpoint. Any upset or malfunction of the pelletizer can result in process shutdown and halt manufacturing with serious financial consequences, especially for large extrusion lines. Therefore, the pelletizing step becomes an important component of the production line of any polyolefin production facility, and it is not to be taken lightly in cases where the polymer renders difficult cut.

Many fiber and film applications of polypropylene resins require that the polymer have high melt flow properties, usually 100 MFI and higher. In particular, the production of non-woven fabrics by melt blown fiber processes calls for polypropylene grades in the range of 500–2000 MFI. The current practice follows two paths. The first one is the coating of granular resin with peroxide and the second is the production of pellets having unreacted peroxide via a process of partial peroxide degradation. Both processes have the disadvantage that the processor has to perform further chemical modification during the production of the final article leading to process complications, product quality control problems and higher cost.

Other disadvantages are that the peroxide-doped granular or pelleted resin systems are not homogeneous blends of the polymer with peroxide resulting in a polymer product having non-uniform final melt flow property. Also, if the peroxide/polymer system is in masterbatch form, as is often the case, there may be problems with bleed out during storage and transportation to the customer. The granular system also has the additional disadvantage that the processor has to process granules and not pellets leading to bulk density variations of the feedstock, bridging of granules in feed hoppers, poor conveying, feeding and melting, excessive amounts of fines, and overall safety and housekeeping difficulties as compared to pelleted form. Similarly, the peroxide-laden pellets, besides problems with inhomogeneities in melt flow and peroxide concentrations, suffer from the limitation that their melt flow cannot exceed the level above which pellets can be produced by means known in the art, usually 100 MFI.

This limitation can lead to a too narrow molecular weight distribution of the final article produced using the processor's equipment because the melt flow control over and above the 100 level is governed only by peroxide degradation (which causes the narrowing of the molecular weight distribution). If, for example, the optimum polymer system calls for a reactor grade (starting) melt flow of 450 as is usually preferred, there is no means known in the art to produce a polymer pellet system of 450 MFI with unreacted residual peroxide.

An ultra high melt flow grade crystalline polymer typically has a melt flow (MF) of about 50 dg/min or greater. The MF of a ultra high melt flow crystalline polymer can be as high as 15,000 or greater. Ultra high melt flow polymers in the range of about 1000–2000 are particularly useful for the production of non-woven fabrics by melt blown fiber processes. In order to employ ultra high melt flow polymers in commercial processing equipment, it is desirable to utilize the ultra high melt flow polymer as a pellet feed stock.

Pelletization of polymers using conventional pelletization systems is a well known method of providing a pellet feedstock. There are many types of conventional pelletizers, depending on the material made, application, rates and user preferences. The most common types of pelletizers fall under the following categories: underwater pelletizers, water ring pelletizers and strand pelletizers. An example of a particular type of strand pelletizer system is the water slide pelletizer supplied by Rieter Corp. and Conair. This is well suited for hard to cool, sticky, low viscosity plastics. The strands leaving the die are directed to a declined water trough. Shallow water flow aids the strands down the water path into a cutting chamber. Along the trough, a number of water jet sprays cool the strands. The particulars of equipment design and operation can be found in a number of prior disclosures, examples of which are U.S. Pat. Nos. 5,441,394, 5,313,864, 5,242,289, 5,118,270, 5,310,515, and 4,528,157. The disclosure of each of these patents is incorporated by reference herein in its entirety.

Polypropylene homopolymer and copolymer high melt flow resins have been notoriously difficult to pelletize. Due to low melt strength associated with high melt flow polypropylene resins, reliable and robust underwater pelletizing operations can handle up to 100 MF, perhaps a little higher for lower rate pelleting lines. Due to the low melt strength of such ultra high melt flow crystalline polymers, attempts to pelletize ultra high melt flow polypropylenes with conventional pelletization systems, including underwater pelletization systems, result in an excess amount of non-uniform pellets, malformed pellets, pellet trash and high levels of "fines". Deformation of the polymer pellet is caused by water currents created by rotating knives of the underwater pelletization system. Malformed and non-uniform pellets are undesirable since they tend to bridge in pellet feed hoppers and convey poorly (e.g., plug conveying filters). Further, significant amounts of malformed pellets alter the bulk density of the pellet stock may result in feeding problems in the extrusion line and voids in the final product. In addition to malformed pellets, "trashouts" occur frequently during the production of ultra high melt flow crystalline polymers. Trashouts are extruder shutdowns resulting from polymer buildup on the rotating knives. Such trashouts not only necessitate the consumption of enormous labor and time but induce deterioration of the quality of polyolefin polymer pellets being produced.

Therefore, there is a need to produce pellets of any desired melt flow and molecular weight distribution without any limitations on the reactor grade melt flow that produced them. It has long been desired to find a continuous process for pelletizing ultra high melt flow crystalline polymers to produce uniform, dust-free crystalline polymer pellets having narrow molecular weight distribution. In particular, it is desired to find a high speed continuous process for pelletizing crystalline polymers, such as isotactic polypropylenes, that have a melt flow greater than 100 dg/min.

Further, it is desired to find a process for pelletizing ultra high melt flow crystalline polymers that contain a uniform dispersement of the desired additives and are substantially cracked to produce uniformly compounded pellets having high bulk density.

U.S. Pat. No. 5,340,509, the disclosure of which is incorporated by reference herein in its entirety, which is assigned to Shell Oil Company, describes a process for pelletizing ultra high melt flow crystalline polymers to produce pellet products. It essentially makes use of commercially known technology for droplet forming. Although this disclosure would produce high melt flow pellets, it is limited to extremely low production rates as evidenced by the claims of the manufacturers of the dropformer systems, namely Sandvik Process Systems and Geber Kaiser-Krefeld. These rates adversely affect the rate in which polymer can be made in the reactor. Another disadvantage of the dropforming process as applied to polypropylene is that it is better suited to pelletize high melt flow resins of 1000 and preferably 2000, and above, limiting the MFI range that can be used. There still exists a need to develop a process that can pelletize polyolefin polymers having melt flows greater than 100 MFI without suffering from the drawbacks and disadvantages mentioned above.

SUMMARY OF THE INVENTION

The present invention relates to a process of pelletizing high melt flow polymers and to the pellet products produced thereby. The invention is capable of pelletizing these high melt flow polymers without suffering from trashouts, slow line speed, and other disadvantages noted above.

In accordance with these and other features of the invention, there is provided a method of pelletizing polyolefin polymers having a melt flow of above 100 dg/min comprising feeding a polyolefin granular polymer into a melting/mixing mechanism to provide a molten polymer material. The molten polymer material is optionally passed through a melt pump and through a die to form a plurality of molten polymer strands. The plurality of molten polymer stands then are passed through a water trough declined with respect to the direction of the horizontal arrays where they are subjected to being sprayed with cool liquid a plurality of times in such a manner that the sprayed cool liquid creates turbulent flow and disturbs a thin film of hot water and/or steam that forms around each molten polymer strand as it is cooled. Subjecting the molten polymer strands to such a cooling procedure produces cooled polymer strands, which then are transported to a cutting mechanism and cut into pellets. Further, the process is capable of producing high melt flow crystalline polymer pellets having uniform distribution of additives and cracking aids.

DETAILED DESCRIPTION OF THE INVENTION

The process of the present invention is particularly useful in pelletizing crystalline thermoplastic polymers having a melt flow of at least 100 dg/min (as determined using ASTM D1238, Condition L). It is preferred that the crystalline polymer have a melt flow of at least about 150 dg/min. Crystalline polymers having a melt flow of at least about 200 dg/min are more preferred, with polymers having a melt flow of greater than about 300 dg/min being most preferred. Prior to pelletization, the crystalline polymer introduced to the process can have the desired melt flow, (e.g., made in the reactor to produce a granule having the requisite melt flow), or it can be converted in the extruder to a high melt flow crystalline polymer by the addition of peroxide, or other free radical initiators.

Other methods of providing a pellet feedstock for further processing are known. One such method involves coating polymer pellets or granules of a cracked polymer resin having a melt flow in the range from about 0.1 dg/min to about 1000 dg/min with an amount of peroxide sufficient to crack the resin to higher melt flows, say on the order of about 150 to about 3000, during further processing, such as fiber spinning. In addition to the peroxide, one or more additional additives may be added during the coating. The coating process has the disadvantage that the granular resin or pellets are not uniformly coated and therefore, results in a polymer product having non-uniform melt flow and additive dispersion.

The crystalline high melt flow polymer to be pelletized in accordance with the invention can be any crystalline polymer which is a polyolefin homopolymer having 2–18 carbon atoms in the repeat unit, a polyolefin copolymer having at least one comonomer that has repeat units having 2–18 carbon atoms, or blends of such polymers. Exemplary of suitable crystalline polymers are polypropylene, polybutylene, polyethylene, ethylene-propylene copolymers, and propylene-butene-1 copolymers and blends thereof.

The high melt flow crystalline polymer, either granular having the requisite melt flow, or granular together with a free radical initiator to enhance the melt flow, is fed into a melting mixing mechanism, such as an extruder, mixer or heated mixing container, that melts the crystalline polymer to provide a uniform molten polymer material. Any melting mixing mechanism can be used in the invention which is capable of melting and mixing the polyolefin, together with any additives and/or free radical initiators, that may be added during mixing, or upstream from the melting mixing mechanism. The melting mixing mechanism preferably is an extruder, albeit a twin screw, co-or counter-rotating, self wiping or tangential extruder.

During the above extrusion process, various additives such as stabilizers, performance enhancers, acid scavengers, extrusion and processing aids, etc. can be added and compounded. Any additive can be added to the polymer during the extrusion process, and skilled artisans are capable of adding suitable additives to polyolefin polymers during extrusion. It is preferred in the present invention that the polypropylene polymer can be homopolymer, ethylene random or rubber modified impact copolymer.

The molten crystalline polymer material exiting the extruder barrel can be transferred under a positive pressure that is not limited, but preferably is from about 30 psi to about 360 psi, although skilled artisans will readily recognize that smaller die openings will require higher pressures. The pressure required can be supplied from any transferring means such as a positive displacement gear pump, a melt pump, or the like, and at a temperature in the range from about 360° F. to about 600° F. A temperature from about 380° F. to about 520° F. is preferred, with a temperature from about 400° F. to about 500° F. being more preferred.

The molten polyolefin then is passed through a die to form a plurality of molten polymer strands in one or more horizontal arrays. It is preferred that the molten polyolefin is passed through a die specially designed to deliver strands into a water slide pelletizer as described by U.S. Pat. Nos. 5,441,394; 5,313,864; 5,242,289; 5,118,270; 5,310,515; 4,528,157, the disclosures of which are incorporated by reference herein in their entirety. The expression "one or more horizontal arrays" denotes the configuration of molten strands that exits the die. The strands typically are extruded through the die in a series of substantially horizontal, substantially equally spaced apart parallel rows of molten polymer strands. Due to the declined nature of the water trough, the strands can be extruded through the die at an angle declined from horizontal, for example, from 20 to 50 degrees downward from horizontal. There is no requirement that the molten polymer strands be parallel, although a parallel configuration typically is easier to process downstream. In addition, there is no requirement that the strands be exactly horizontal or exactly equally spaced apart, although again, a horizontal and equally spaced apart arrangement typically is easier to process downstream.

The number of strands emerging from the die at the end of the extrusion train is dependent on the polymer melt rate, and on the configuration of the die. Each strand can have a diameter between 1–10 mm, preferably 2–5 mm and most preferably 2.5–3.5 mm with minimal extrudate swell. The rate per strand can be anywhere from about 5–120 lb/hr, preferably 30–80 and most preferably 40–60 lbs/hr.

The molten polymer strands exiting the die then are passed through a water trough declined with respect to the direction of the horizontal arrays where they are subjected to being sprayed with cool liquid a plurality of times in such a manner that the sprayed cool liquid creates turbulent flow and disturbs a thin film of hot water and/or steam that forms around each molten polymer strand as it is cooled. The declined water trough can have a variable total length and width, so that it can be changed depending on various conditions of the molten strands. For example, molten strands of higher melt flow typically will require a longer water trough, as well as molten strands that are hotter after processing in the melting mixing mechanism. Typically, the length of the water trough capable of effectively cooling crystalline high melt flow polyolefins having a melt flow above about 100, are on the order of from about 5 to about 40 ft., preferably from about 7 to about 30 ft, and most preferably from about 14 to about 20

The width can vary depending, inter alia, on the number of strands and equipment manufacturer specifications. Skilled artisans are capable of determining the appropriate length and width of the water trough using the guidelines provided herein. It is preferred in the present invention to pass the molten polymer strands through a water trough and pelletizing apparatus supplied by Rieter Corporation and/or The Conair Group, Inc.

In addition, there may be a corresponding inclining water trough connected to the declining water trough thereby forming a "V" shape. The inclining water trough may assist in feeding the cooling polymer strands to the cutting mechanism. The width and length of the inclining water trough also may vary depending on the features noted herein.

As the strands proceed down the declined water trough, the polymer temperature reduces until the bulk of the strand attains a temperature lower than the polymer melting point. The water trough contains a small amount of water, sufficient to cover at least a portion of the polymer strands, which assists the flow of the molten polymer strands, and assists in the cooling of the strands. The molten polymer strands also are cooled by a plurality of water jet sprays that are positioned to spray water onto moving polymer strands. The action of the water jets is designed so that it creates turbulent flow around the polymer strands, thereby disturbing a thin film of hot water/steam which forms around the strands as they cool and make their way down the water trough without putting undue linear acceleration on the strands that would cause undesirable strand narrowing or breakage. It has been found, however, that the inventive system is robust in that even if strand breakage does occur because of upstream disturbances in the extruder, for example, the cutting continuity of the pelletizer is not necessarily affected and the process can recover to normal operation of continuous strands.

While not intending to be bound by any theory, the present inventors believe that disturbing the thin film of hot water/steam that forms around the molten polymer strands enables efficient and effective cooling of the high melt flow crystalline polymer strands so that the strands can subsequently be cut in a pelletizing apparatus. Conventional pelletizers were not capable of processing such high melt flow crystalline polyolefins because of poor melt strength of the high MF polymers. Typical strand operations depend on a pulling mechanism, usually part of the strand cutter, to pull the molten and cooling strands through the water bath. The low viscosity and low melt strength of the high MF polymers do not have sufficient melt strength to be pulled and an excessive narrowing of the strand, usually resulting in strand breakage occurs from the pulling. In the process of the present invention which uses water slide pelletizers, the water velocity is controlled by the declination and water flow to convey the low melt strength molten polymer strands from the die at velocities sufficient to convey the strand with appropriate narrowing, but without breakage. Should breakage occur, the water flow conveys the freshly extruding strand to the pelletizer without operator intervention as would be required in a conventional strand pelletizing system.

The cooled strands then are subsequently directed into a cutting mechanism, such as any conventional pelletizer, either wet or dry, and cut into pellets. Cut pellets can then be de-watered in a downstream dryer, collected and packaged.

During typical processing conditions of 40–60 lbs per hour per strand, the water trough is set at an angle of 1–30 degrees, preferably 3–15 degrees and most preferably 5–10 degrees declined from the horizontal direction. The polymer temperature entering the die can be 180–400° C., preferably 190–350° C. and most preferably 200–350° C. Cooler temperatures require shorter water trough length but develop higher pressure drop though the die. The water used at the molten polymer strand rates indicated above typically flows at a rate of from about 2 to about 20 gallons per minute (GPM) per die orifice, preferably from about 5 to about 15 GPM and most preferably from about 8 to about 12 GPM. Water temperature should be 60–100° F., preferably 65–90° F. and most preferably 70–80° F. Water jets preferably are placed every 0.5–2 feet, preferably every 0.75–1.5 feet and most preferably every 0.8–1.2 feet down the length of the water trough all the way until the cutting chamber. The water jets also preferably are positioned so that they spray water directly onto the moving polymer strand. This configuration promotes the generation of turbulent flow around the surface of the polymer strand, which serves to disturb the thin film of hot water and/or steam that forms around each strand as it cools. The water jet sprays are positioned and water flow controlled so as to not impart excessive linear acceleration of the polymer strand that might cause undesirable strand thinning or strand breakage.

The produced polymer system is most suitable for, but not restricted to, melt blown resin manufacturing without the need for further chemical modification at the customer's end, which is the current practice. It also results in a more uniform melt flow product with smaller variations of flow properties from pellet to pellet. Such polymer systems in pellet form present an advantage from the customer perspective in terms of safety, materials handling and housekeeping. It also increases extrusion rates of melt blown lines when compared to an equivalent polymer granular system doped with peroxide. Finally, it offers the customer better operability and reliability. All the of reactive and mixing technology is taken out of customer's hands and shifted upstream into resin manufacturer's equipment.

It is within the scope of the invention to pelletize a crystalline polymer that has been cracked to a desired ultra high melt flow by the addition of a sufficient amount of peroxide to the crystalline polymer in the melting/mixing mechanism, such as an extruder. The desired melt flow for the molten crystalline polymer material that is transferred from the melting/mixing means is determined and controlled to the desired value by controlling the temperature of the melting/mixing mechanism, the amount of peroxide added to the melting/mixing mechanism and residence time in the melting/mixing mechanism. By appropriate control of such parameters the desired melt flow for the crystalline polymer is attained while the polymer is in a molten state within the melting/mixing mechanism. As such, the molten polymer material is at the desired melt flow value when it is supplied to the water trough and pelletizer. Skilled artisans are capable of altering various reaction processing conditions, as well as adding various additives to achieve the final product melt flow and quality.

The production of uniformly compounded, dust-free crystalline polymer pellets is contemplated within the scope of the invention. The additive or combination of additives, whose provision to the ultra high melt flow crystalline polymer is desired to produce a uniformly compounded product, can be added with the crystalline polymer material to the melting/mixing mechanism, such as an extruder. Additives that are suitable for the pelletization process include additives which are conventionally employed to improve or modify the processability and properties of the ultra high melt flow crystalline polymer. Exemplary of the additives that are useful in the practice of the invention include, but are not limited to, antioxidants, processing stabilizers, acid acceptors, nucleating agents, metal deactivating agents, thermal stabilizers, light or ultraviolet stabilizers, antiblock agents, antistatic agents, lubricants and slip agents which are capable of enhancing the properties and processability of the polymer and the like. Other additives which are useful within the scope of this invention include fillers, pigments and flame retardants.

According to another embodiment of the invention, crystalline polymer powder, typically in granular form, a sufficient amount of at least one additive to obtain a crystalline polymer having the desired processability and properties, and a sufficient quantity of peroxide to crack the polymer powder to a desired higher melt flow are added to melting/mixing mechanism. Pelletization of the resulting molten crystalline polymer material according to the invention provides a substantially cracked, uniformly compounded molten polymer material.

The flexibility of making a wide range of uniform, semi-cylindricalpellets is another advantage of the present invention. Pellet sizes range from about 0.5 mm to about 10 mm in diameter. It is preferred that the pellet size range from about 1 mm to about 8 mm, with a pellet size range from about 2.5 mm to about 6 mm being more preferred.

The process of the present invention successfully produces dust-free polymer pellets. In accordance with the present invention, fine levels less than 0.12 wt %, based on total weight of collected crystalline polymer pellets, can be obtained. Fine levels less than 0.09 wt % are preferably obtained, with fine levels less than 0.05 wt % being more preferred. The resulting uniformly compounded, dust-free, semi-cylindrical pellets have the advantage of smooth pellet handling, uniform bulk density, and uniform additive dispersion.

Although the present invention has been described in connection with the herein described embodiments, it will be appreciated by those skilled in the art that modifications, additions, substitutions, and deletions not specifically described may be made without departing from the spirit and scope of the invention.

The invention is further illustrated by the following Illustrative Embodiments which should not be regarded as limiting.

EXAMPLES

The following examples illustrate various aspects of the present invention. The experimental setup includes a Davis Standard 69 mm DTEX twin screw extruder fed by loss-in-weight feeders. The extruder is attached in-line to a lab water slide trough through a 4-hole die having a 0.200" orifice diameter. The screw configuration of the extruder comprises a mixing section that has two forwarding 45 degree angle kneading blocks two neutral element 90 degree angle kneading blocks. There also is a vent for devolatalizing the visbreaking byproducts. Although the capacity of this equipment is about 2000 pounds per hour, it was run at about 150–260 lb/hr. The extruder also has a variable speed drive which permitted operation at about 300–500 RPM.

The water trough system was a Conair T206 series pelletizer wet cut with a stellite rotor. For these experiments, a 9 foot in length trough was used with a 12" width on the extruder side, and a narrower 6" width on the cutting chamber taper with 6 water jet spray zones (2-2-2-2-1-1). After cutting, both freshly cut pellets and water were directed into a 6 foot post cooling trough and then into a spin dryer. The water re-circulation line included a cooler and a pump operating at about 30–40 GPM.

In these examples, a variety of homopolymer and random copolymer polypropylene resins as shown in the table below were processed. The peroxide addition (Triganox 101, commercially available from Akzo Nobel Chemicals, Inc., Chicago, was performed in-line by "dripping" the peroxide in the extruder feed hopper using a dual-piston positive displacement micropump rated at 10 microliters per minute to 10 milliliters per minute. The polypropylene visbreaking reaction was completed in the extruder prior to the molten polymer entering the water trough by insuring adequate residence time and mixing in the extruder

TABLE 1

| PP Resin | Initial Melt Flow (dg/min) | Final Melt Flow (dg/min) | Triganox 101 added (ppm) |
| --- | --- | --- | --- |
| Homopolymer | 112 | 398 | 1200 |
| Homopolymer | 112 | 715 | 2300 |
| Homopolymer | 610 | 1154 | 350 |
| Homopolymer | 608 | 1378 | 500 |
| Homopolymer | 1291 | 1291 | 0 |
| Homopolymer | 1291 | 2883 | 500 |
| Copolymer | 710 | 1011 | 350 |
| Copolymer | 710 | 1349 | 500 |

All of the above resins were pelletized successfully with excellent operational stability and reliability and pellet uniformity. Based on the results of these examples, it is apparent that there is no limitation as to how high in melt flow one can pelletize. The length of the water bath of the lab scale unit is 9 ft. Typically, the length would be about 14 ft. which is believed to provide even better results. The maximum throughput rate utilized in these examples was 65 lb/hr/strand, although higher throughput can be achieved if there is more time for efficient cooling. The melt temperature exiting the die was as high as 250° C. The pellet shape and size was quite uniform, looking like near perfect cylinders of about less than 0.1" diameter. The latter can vary by controlling the water trough declination, strand pelletizer speed, water flowrate and cooling length. For greater strand diameter control, die hole geometry is employed.

While the invention has been described with reference to particularly preferred embodiments, those skilled in the art recognize that various modifications can be made without significantly departing from the spirit and scope of the invention. All documents referred to herein are incorporated by reference in their entirety.

We claim:

1. A method of pelletizing polyolefin polymers having a melt flow of above 100 dg/min comprising:

feeding a polyolefin granular or pelleted polymer into a melting/mixing mechanism to provide a molten polymer material;

feeding the molten polymer material through a die to form a plurality of molten polymer strands in at least one horizontal array;

cooling the plurality of molten polymer strands by feeding them through a water trough declined from the die with respect to the direction of the at least one horizontal array at an angle of 1 to 30 degrees from the at least one array and spraying the plurality of molten polymer strands with cool liquid a plurality of times in such a manner that the sprayed cool liquid creates turbulent flow and disturbs a thin film of hot water and/or steam that forms around each molten polymer strand as it is cooled without imparting undesirable axial acceleration on the strand to form cooled polymer strands; and pelletizing the cooled polymer strands in a cutting device to form polymer pellets.

2. The method as claimed in claim 1, wherein feeding the polyolefin granular or pelleted polymer into a melting/mixing mechanism to provide a molten polymer material comprises contacting the granular or pelleted polymer with a free radical initiator prior to feeding the granular polymer to the melting/mixing mechanism.

3. The method as claimed in claim 1, wherein feeding the polyolefin granular or pelleted polymer into a melting/mixing mechanism to provide a molten polymer material comprises contacting the granular polymer with a free radical initiator in the melting/mixing mechanism.

4. The method as claimed in claim 1, wherein the melting/mixing mechanism is an extruder.

5. The method as claimed in claim 1, wherein spraying the molten polymer strands in the water trough comprises spraying with a plurality of water jets spaced along the length of the water trough by a distance of from about 0.5 to about 2 feet.

6. The method as claimed in claim 5, wherein spraying the molten polymer strands in the water trough comprises spraying with a plurality of water jets spaced along the length of the water trough by a distance of from about 0.8 to about 1.2 feet.

7. The method as claimed in claim 1, wherein the water trough is declined with respect to the direction of the horizontal arrays by an angle of from about 5 to about 10 degrees.

8. The method as claimed in claim 1, wherein the polyolefin polymer is selected from the group consisting of polypropylene, polybutylene, polyethylene, ethylene-propylene copolymers, propylene-butene-1 copolymers, and blends thereof.

9. The method as claimed in claim 1, wherein the polyolefin polymer has a melt flow of above about 400 dg/min.

10. A method of pelletizing polyolefin polymers having a melt flow of above 100 dg/min comprising:

feeding a polyolefin granular or pelleted polymer into a melting/mixing mechanism to provide a molten polymer material;

feeding the molten polymer material through a die which is angled downward from horizontal not more than about 50 degrees to form a plurality of molten polymer strands in at least one array;

cooling the plurality of molten polymer strands by feeding them through a water trough declined from the die with respect to the direction of the at least one array at an angle of 1 to 30 degrees from horizontal and spraying the plurality of molten polymer strands with cool liquid a plurality of times in such a manner that the sprayed cool liquid creates turbulent flow and disturbs a thin film of hot water and/or steam that forms around each molten polymer strand as it is cooled without imparting undesirable axial acceleration on the strand to form cooled polymer strands; and pelletizing the cooled polymer strands in a cutting device to form polymer pellets.

* * * * *